US012755663B2

(12) United States Patent
Lookofsky

(10) Patent No.: US 12,755,663 B2
(45) Date of Patent: Oct. 6, 2026

(54) TRANSPARENT AND TRANSLUCENT DISPLAYS AND METHODS THEREOF

(71) Applicant: Supernal, LLC, Washington, DC (US)

(72) Inventor: Chase Lookofsky, Carlsbad, CA (US)

(73) Assignee: Supernal, LLC, Irvine, CA (US)

( * ) Notice: Subject to any disclaimer, the term of this patent is extended or adjusted under 35 U.S.C. 154(b) by 480 days.

(21) Appl. No.: 18/342,213

(22) Filed: Jun. 27, 2023

(65) Prior Publication Data

US 2024/0021127 A1 Jan. 18, 2024

Related U.S. Application Data

(60) Provisional application No. 63/368,590, filed on Jul. 15, 2022.

(51) Int. Cl.
*G09G 3/20* (2006.01)

(52) U.S. Cl.
CPC ......... *G09G 3/20* (2013.01); *G09G 2320/066* (2013.01); *G09G 2354/00* (2013.01); *G09G 2360/144* (2013.01)

(58) Field of Classification Search
CPC ............... G09G 3/20; G09G 2320/066; G09G 2354/00; G09G 2360/144
See application file for complete search history.

(56) References Cited

U.S. PATENT DOCUMENTS

| | | | | |
|---|---|---|---|---|
| 6,144,359 A * | 11/2000 | Grave | G02F 1/133605 | 345/207 |
| 9,007,277 B2 * | 4/2015 | Fleck | G09G 3/20 | 345/1.1 |
| 10,982,487 B2 * | 4/2021 | Ramirez | B60K 35/26 | |
| 12,339,557 B2 * | 6/2025 | Martinson | H02J 50/20 | |
| 2012/0105306 A1 * | 5/2012 | Fleck | G09G 3/20 | 345/1.1 |
| 2016/0139714 A1 * | 5/2016 | Hsiao | G09G 3/20 | 345/173 |
| 2021/0054690 A1 * | 2/2021 | Ramirez | B60K 35/10 | |
| 2021/0054691 A1 * | 2/2021 | Ramirez | B60L 8/003 | |
| 2021/0364793 A1 * | 11/2021 | Fujiwara | G09G 5/10 | |
| 2023/0350260 A1 * | 11/2023 | Martinson | B32B 17/10513 | |
| 2025/0022433 A1 * | 1/2025 | Ku | G09G 3/38 | |

FOREIGN PATENT DOCUMENTS

| | | | |
|---|---|---|---|
| DE | 102016116569 A1 * | 3/2018 | G09G 3/20 |
| EP | 3291214 A2 * | 3/2018 | G09G 3/20 |
| EP | 3291214 B1 * | 11/2022 | G09G 3/20 |

* cited by examiner

*Primary Examiner* — Michael Pervan
(74) *Attorney, Agent, or Firm* — Bookoff McAndrews, PLLC

(57) ABSTRACT

A display includes at least one substantially transparent structural layer, a display layer configured to present visual content, and a first dimmable layer positioned relative to a first surface of the display layer. The display may include at least one sensor configured to monitor a parameter corresponding to a characteristic of an environment in which the display is provided. The display may include a display control configured to control an input voltage to the dimmable layer to operate the dimmable layer to provide a degree of contrast based on values of the parameter provided by the at least one sensor.

20 Claims, 11 Drawing Sheets

TRANSPARENT AND TRANSLUCENT DISPLAYS AND METHODS THEREOF

CROSS REFERENCE TO RELATED APPLICATIONS

This application claims the benefit of priority to U.S. Provisional Application No. 63/368,590 filed Jul. 15, 2022, which is incorporated by reference herein in its entirety.

TECHNICAL FIELD

The present disclosure relates to displays and display systems that may adjust aspects of visual elements displayed, thereby based on a surrounding environment and application. In particular, the present disclosure relates to displays that include sections that are at least partially transparent or translucent, and may be incorporated in homes and entertainment systems, classrooms and educational systems, windows, and vehicles or various modes of transportation.

BACKGROUND OF THE DISCLOSURE

Transparent or translucent displays may include devices configured to present visual content in a structure that is substantially transparent or translucent. Thus, areas of the display where the visual content may not be presented may allow for a substantially unobstructed view of an area on a side of the display opposite from a side from which the display is being viewed. Unfortunately, the usefulness of such displays is largely dependent on light (e.g., intensity, type, color, luminance of the environment, luminance of the display), weather, condition or state of operation of a structure or device including the display, and other (varying) characteristics of an environment in which these displays are provided. It is often the case that the visual content being presented is indiscernible because the subject transparent or translucent display is incapable of generating any type of visual aid that provides contrast relative to the visual content.

The present disclosure is accordingly directed to improvements to transparent or translucent displays that may be configured to allow visibility of an area on one side of a structure in which the display is installed, through the display from an opposite side of the structure. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

Examples described herein include devices, systems, and methods directed toward a display including at least one substantially transparent structural layer, a display layer configured to present visual content, and a first dimmable layer positioned relative to a first surface of the display layer. The display may include at least one sensor configured to monitor a parameter corresponding to a characteristic of an environment in which the display is provided. In addition, the display may include a display control configured to control an input voltage to the first dimmable layer to operate the first dimmable layer to provide a degree of contrast based on values of the parameter provided by the at least one sensor.

Various additional aspects of exemplary devices, systems, and methods according to the present disclosure related to transparent and translucent displays may include one or more of the following features: at least one sensor including a plurality of sensors; at least one sensor configured to detect luminance in an environment in which a display is provided; and sensors configured to detect luminance and at least one of motion, fluorescent light, speed, and temperature.

Furthermore, various additional aspects of exemplary devices, systems, and methods according to the present disclosure related to transparent and translucent displays may include one or more of the following features: a second dimmable layer positioned relative to a second surface of the display layer; a touch layer positioned on a structural layer of a display and configured to receive input associated with at least a portion of visual content presented by a display layer; visual content including one or more of an image, text, and media; a first dimmable layer including a plurality of sections, each section being configured to be operated to provide a respective degree of contrast; a display control is configured to adjust an input voltage to the first dimmable layer to change the degree of contrast; and a first dimmable layer including sections, the display control being configured to adjust respective input voltages to the sections to change degrees of contrast respectively provided by the sections.

Various additional aspects of exemplary devices, systems, and methods according to the present disclosure related to transparent and translucent displays may include one or more of the following features: a first dimmable layer configured to be operated in an active state and an inactive state, the first dimmable layer being configured to be substantially transparent in one of the active state and the inactive state, and the first dimmable layer being configured to be substantially opaque in one of the active state and the inactive state.

Examples according to the present disclosure may further include devices, systems, and methods directed toward a display including a first structural layer, the first structural layer being substantially transparent, a second structural layer, the second structural layer being substantially transparent, and a display layer configured to present visual content. The display may further include a first dimmable layer positioned between the display layer and the first structural layer, and a second dimmable layer positioned between the display layer and the second structural layer. In addition the display may include at least one sensor configured to monitor a parameter corresponding to a characteristic of an environment in which the display is provided, and a display control configured to operate the first dimmable layer and the second dimmable layer to provide respective degrees of contrast based on values of the parameter provided by the at least one sensor. According to an aspect of the present disclosure, at least one of the first dimmable layer and the second dimmable layer includes sections and each section may be configured to be operated to provide a respective degree of contrast.

Various additional aspects of exemplary devices, systems, and methods according to the present disclosure related to transparent and translucent displays may include one or more of the following features: at least one touch layer positioned on one of a first structural layer and a second structural layer, the at least one touch layer being configured to receive input associated with at least a portion of the visual content presented by the display layer, and a portion of visual content defines a user interface component that is selectable through an operation of a touch layer.

Examples according to the present disclosure may further include devices, systems, and methods directed toward a display system including a first display, a second display, one or more processors, and one or more computer readable media comprising instructions. According to at least one aspect of the present disclosure each of the first display and the second display may include at least one substantially transparent structural layer, a display layer configured to present visual content, a first dimmable layer positioned relative to a first surface of the display layer, and at least one sensor configured to monitor a parameter corresponding to a characteristic of an environment in which a respective one of the first and second displays is provided. According to another aspect of the present disclosure, the instructions, when executed by the one or more processors, may cause the one or more processors to perform operations including operating the dimmable layers to provide respective degrees of contrast based on values of the parameter provided by respective at least one sensors. In addition, in some examples, the first display and the second display may be positioned within a structure, and the first display may be surrounded by the second display.

Additional objects and advantages of aspects of the present disclosure will be set forth in part in the description that follows, and in part will be apparent from the description, or may be learned by practice of the examples described herein. Furthermore, objects and advantages of the disclosed examples will be realized and attained by means of the elements and combinations particularly pointed out in the appended claims.

It is to be understood that both the foregoing general description and the following detailed description are exemplary and explanatory only and are not restrictive of the disclosed examples, as claimed.

BRIEF DESCRIPTION OF THE DRAWINGS

The accompanying drawings, which are incorporated in and constitute a part of this specification, illustrate various exemplary aspects of the present disclosure and together with the description, serve to explain the principles of the disclosed examples.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
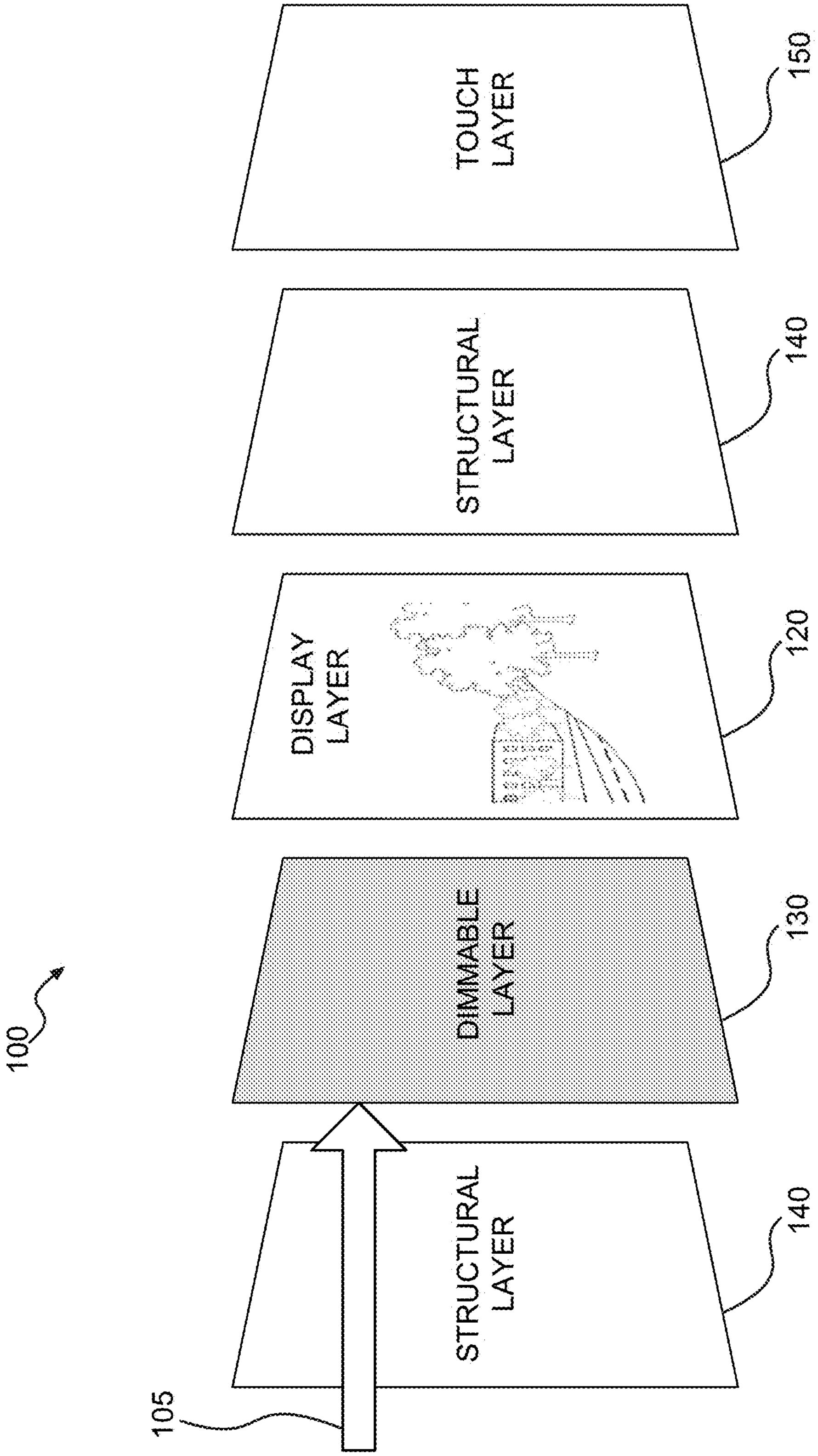
FIG. 1 depicts an exploded view of an example display, according to one or more aspects of the present disclosure.

FIG. 1 depicts an exploded view of an example display 100, according to one or more aspects of the present disclosure. Display 100 may include display layer 120, one or more structural layers 140, and at least one dimmable layer 130 positioned between display layer 120 and one of structural layers 140. In some examples, display 100 may include touch layer 150. According to one or more aspects of the present disclosure, display 100 may be a transparent or translucent display.

Display 100 may be incorporated into a window, a stand-alone display, a tablet, a desk, a space divider, an informational center (e.g., in shopping centers), a vehicle (e.g., bus, automobile, train, aircraft), or other structure. In one or all of these example applications, display layer 120 may be configured to display media, text, images, or combinations thereof. For example, display layer 120 may comprise a liquid crystal display (LCD), a thin-film-transistor (TFT) liquid crystal display, light emitting diode (LED) displays and their derivatives, Organic LED (OLED), a polarizing filter, and a color filter. Depending on the application, in various examples, one or more of structural layer 140 may include one or more of glass, plastic, or any other transparent or translucent material (e.g., polycarbonate laminates, acrylic material, etc.). Structural layers 140 for display 100 may be formed from the same or different materials.

As shown in FIG. 1, display 100 includes two structural layers 140, however in other examples, only one structural layer 140 may be used. Alternatively, display 100 may include more than two structural layers 140. Similar to structural layers 140, example displays according to the present disclosure may include more than one of dimmable layer 130 shown with display 100 of FIG. 1. More specifically, two dimmable layers 130 may be provided on each side of display layer 120 to selectively allow some users to see display layer 120 on one side but not the other side of display 100.

Dimmable layer 130 may be composed of one or more different types of smart glass technology (e.g., an electrochromic layer, polymer-dispersed liquid crystals (PDLCs), micro blinds, etc.). The choice of material utilized in dimmable layer 130 may ultimately depend on a variety of factors (e.g., desired use purpose, cost, speed, etc.) as each material contains different characteristics that may affect a level of transmissivity of the subject layer and the speed with which such transmissivity may be achieved. For example, utilization of an electrochromatic layer or a series of micro blinds may enable a user to achieve a substantially blacked out display (e.g. useful in situations in which a user is viewing a type of digital media content such as a movie, television show, etc.), whereas utilization of PDLCs may provide a display that is more translucent (e.g., useful in situations in which a user wants at least some portion of display 100 to be see through so that they may visualize objects in their world view). Collectively, however, each of these materials enables the transmissivity of dimmable layer 130 to be altered (e.g., to achieve full or partial field alterations) through an electrical control mechanism. Such an electrical control mechanism, in the case of electrochromatic layers for example, may sit between the computer and display 100 to assess the reference pixel locations and apply a predefined dimming instruction based on one or more of: ambient lighting conditions, displayed object color, user preferences, and the like. In some examples, it is contemplated that a combination of two or more dimming technologies may be leveraged to provide the user with greater choice on how the dimming effect is manifested. For example, display 100 may have two dimmable layers 130, one composed of a first dimming technology (e.g., configured to dim to black) and a second layer composed of a second dimming technology (e.g., configured to become opaque). In such a configuration, the user may choose to institute a white contrast or a black contrast in the dimming regions.

In some examples, dimmable layer 130 may be operable by adjusting an input voltage. Dimmable layer 130 may be configured to block light from at least a first direction 105 by increasing contrast (e.g., become darker) in one, more than one, or all areas of display 100 coinciding with at least a portion of dimmable layer 130. Furthermore, dimmable layer 130 may be tinted to a darker color, for example, black, dark blue, or a permutation thereof. Dimmable layer 130 may be configured to block some light or substantially all light (e.g., become substantially opaque). For example, in situations where display 100 is only partially dimmed, current is only applied to those reference areas that display content. Generally, however, the dimming capabilities of dimmable layer 130 may be controlled to as fine a resolution as desired by an end user for their particular use case. In some examples, dimmable layer 130 may be configured to default to a transparent or translucent condition if power is lost. In some examples, dimmable layer 130 may include a battery backup power source, which may be tied to emergency lighting.

Example dimmable layers, such as dimmable layer 130, may include separately dimmable sections. An area of dimmable layer may be substantially equal to, greater than, or less that a display layer incorporated in a display including that dimmable layer. Accordingly, in some examples a dimmable layer may completely surround or be completely surrounded by a display layer for which the dimmable layer can affect a visibility of elements displayed thereby. In other examples, dimmable layers according to the present disclosure may be substantially similar in shape and size to a display layer.

In addition to the features mentioned above, example dimmable layers according to the present disclosure may be configured to dim around displayed elements, e.g., textual or graphical representations. Furthermore, example dimmable layers according to the present disclosure may be configured to dim around selected portions of displayed elements, such that selected portions are of less relative luminance when compared to a luminance of an environment. As described in more detail with reference to the example methods of FIGS. 3 and 5, and other features described herein, dimmable layers according to the present disclosure may be controlled to selectively change degrees of luminance/contrast of different portions of that layer based on environment, actions of a user, position of a user relative to a display including the dimmable layer, content displayed by a display layer, and/or a location of particular displayed content relative to locations where other content may be displayed.

In addition to the features described above, example dimmable layers according to the present disclosure may operate or be operated according to active and inactive states. In some examples, an active state for a dimmable layer may include operations in which the dimmable layer or portions thereof, actively change or monitor an environment as part of a process for changing degrees of luminance/contrast. On the other hand, and inactive state may correspond to operations of the dimmable layer in which degrees of luminance/contrast are not changed as result of: characteristics of an environment remaining static for a predetermined period of time; the absence of a triggering event occurring or being initiated for a predetermined period of time; a deliberate or un-intended disruption of power being supplied to the dimmable layer; an occurrence of a triggering event that includes a display control receive a command to operate the dimmable layer in an inactive mode or default mode; or combinations thereof. In some examples, dimmable layers according to the present disclosure, such as dimmable layer 130, may be configured to block less than all light or substantially all light (e.g., become substantially opaque) when operated according to an inactive state. In other examples, an example dimmable layer may be configured to default to a transparent or translucent condition when operated according to an inactive mode.

Example displays, such as display 100 of FIG. 1, may be incorporated in a range of transparent structures such as windows, room/space/desk dividers, desk and table tops, and many others. Furthermore, each individual layer or the system of layers of which an example display, such as display 100, is comprised, may be flat, two-dimensional, three-dimensional and curved, or flexible. Accordingly, any and all of layers 120, 130, 140, 150 of display 100 may be formed from flexible and/or pliable material and thereby shaped to some degree as part of an application-dependent assembly process. For example, an application for display 100 may require display 100 serve as part of a curved surface, such as the window of an aircraft.

In some examples, dimensions of one or more of display, dimmable, structural, or touch layers 120, 130, 140, 150 may be configured according to a desired flexibility, thickness, degree of transparency/translucency, light or heat dissipative capability, or other installation requirement or performance metric. Structural layers 140 may have the same thickness, while in other examples this dimension may be different for structural layers 140.

In some examples, an example display according to the present disclosure, such as display 100 of FIG. 1, may be incorporated into a display system. More specifically, such a display may be one of several operatively linked displays that are incorporated into walls, panels, windows, or the like, which provide some portion of a structure. Such a structure may be enclosed, free-standing, mobile, stationary, define a device (e.g., a computing device installed in a wall or window), or define a sub-structure within another type of display. As discussed in more detail with reference to FIG. 2, example systems of displays according to the present disclosure may be operatively connected via wired connections or other physical connectors, wirelessly over a network or other suitable wireless protocols, and/or through a display control configured to operate the displays within the system. In particular, such a display control may be configured to operate dimmable layers between active and inactive states, portions of dimmable layers between active and inactive states, display layers, and portions of display layers of the displays in a coordinated manner based on visual content to be displayed and/or sensed parameters of an environment to which a respective system of displays is subject to.

Figure 2:
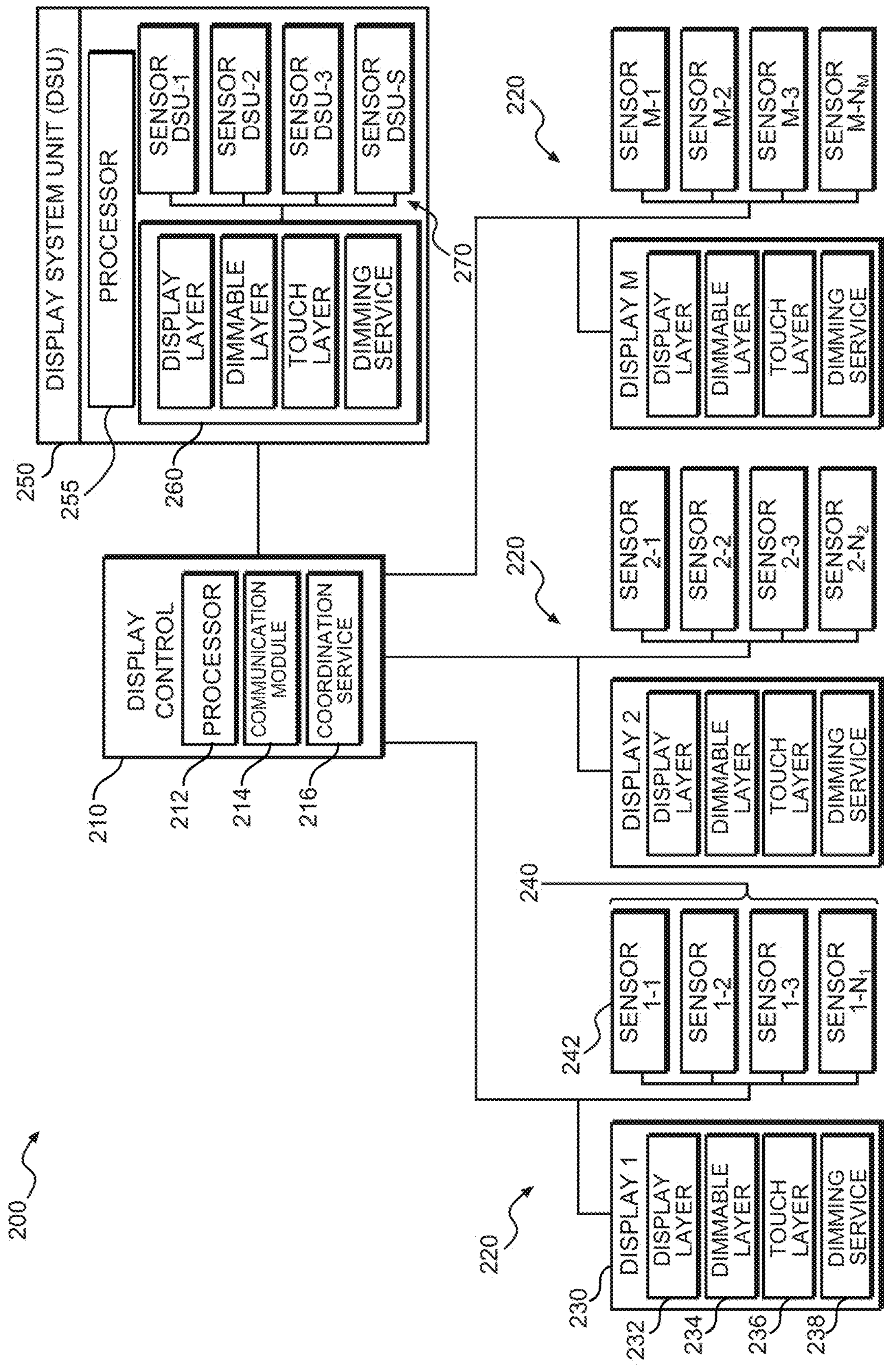
FIG. 2 depicts an example display system, according to one or more aspects of the present disclosure.

FIG. 2 depicts an example display system 200, according to one or more aspects of the present disclosure. As shown, display system 200 may include display control 210 operatively connected to a plurality of display sub-systems 220. In one example, display control 210 may instead, or additionally, be operatively connected to display system unit (DSU) 250. Display control 210 may include one or more processors 212 and communications module ("comms mod") 214, and may implement coordination service 216.

Display control 210, each display sub-systems 220, and DSU 250 may be comprised of one or more computing devices that may each include a processor, a memory storage, and a non-transitory computer-readable medium containing instructions that are executed by the processor. In addition, each of these example system components may be configured as a computing device for executing the processes according to one or more examples of the present disclosure. In some examples, processor 212 of display control 210 may be specifically configured to process display data and identify various types of content encompassed by the display data.

Coordination service 216 may direct the operation of displays 230 of display sub-systems 220. In some examples, coordination service 216 may directly operate or communicate (through comms mod 214) with display layer 232, dimmable layer 234, and/or touch layer 236 of any one or more of display sub-systems 220. Alternatively, or in addition, coordination service 216 may direct and/or establish parameters for operations of any of the above-mentioned layers for any of display sub-systems 220 through a respective dimming service 238 installed in, or otherwise implemented by, any of display sub-systems 220. In some examples, communication module 214 may also provide communication between coordination service 216 and one or more sensors 242 of sensor arrays 240 incorporated in display sub-systems 220.

As discussed above, each of display sub-systems 220 may include a respective display 230 and sensor array 240. Display and dimmable layers 232, 234, and an optional touch layer 236 of display 230 may be substantially similar to display, dimmable, and touch layers 120, 130, 150 of display 100, and/or include features of other versions of such layers described herein. In some examples, sensors 242 for a respective sensor array 240 may be of the same or different types of sensors. More specifically, each sensor array 240 may have a respective combination of different types of sensors 242 detecting different parameters and having different functional (e.g., sensitivity, range) capabilities.

In some examples, sensors 242 provided in one or more of sensor arrays 240 may include luminance, natural light, fluorescent light, motion detection, proximity, speed, optical encoder-type, temperature, and/or smoke detection sensors. Any of sensor arrays 240 may be composed exclusively of one type of light sensor (e.g., luminance, natural light, fluorescent light, etc.), or at least one type of light sensor and one or more other types of sensors, including but not limited to, the sensor types previously mentioned. In some examples, any of sensor arrays 240 may include a plurality of one type of light sensor, but with different functional capabilities with respect to a type of light detected. For example a group of luminance sensors may be included in one of sensor arrays 240, with one or more of the sensors configured cover a first area range and one or more other sensors configured to cover a second area range greater than or less than the first area range. In some examples, all sensors 242 in sensor arrays 240 may be positioned on the display, or on the device containing the device. In other examples, some or all sensors 242 in sensor arrays 240 may be positioned on other objects proximate to the display (e.g., some sensors 242 may be positioned on the display whereas other sensors 242 may be positioned around a cabin compartment in which the display is located).

In other examples, any of sensor arrays 240 may include a combination of light sensors of the same or different types, motion sensors, and proximity sensors. Information from one type of sensor, such as a motion or proximity sensor, may be given priority or used to direct a display layer to render visual content encompassed by display data in different locations. The location selected may correspond to a location that is exposed to some level of light (e.g., luminance) as compared to a degree to which that location may be dimmed through operation of a dimmable layer and/or a characteristic level of transparency/translucency of an area of a respective display including the location. In some examples, any of sensor arrays 240 may be configured to measure/detect other parameters, in addition to or in lieu of luminance, that may impact content rendering, including: user preference indications, color of the background against which an object is being rendered, and the color of the actual object that is being rendered. For instance, control logic may determine to adjust a color of the display background from dark to white based on sensor information indicating that a dark object is being, or is about to be, presented on the display.

Configurations of sensors 242 for any of sensor arrays 240 may depend on a particular application for which display system 200 is employed. In particular, a number, positions relative to respective display and dimmable layers 232, 234 (and touch layer 236 if included), and an arrangement relative to and/or within a respective display 230 may, for example, vary depending: on whether display system 200 or certain components thereof are incorporated in windows; indoor walls; outdoor walls; vehicles; educational institutions; office buildings or laboratories having fluorescent lights; stationary installations; movable objects other than vehicles; or other structures.

Each of coordination and dimming services 216, 238 may be an application or agent that may be part of, or configured to be compatible with, a software product that is installed on or at least partially provided by processor 212 of display control 210 or processor 255 of DSU 250. In some examples, one or more of display sub-systems 220 may include a dedicated processor (not shown) that may implement a respective dimming service 238 independently of or in combination with processor 212 of display control 210.

Example software products providing coordination and/or dimming services 216, 238, or portions/modules thereof, can provide tools for: identifying conditions that require operations of one or more dimmable layers; generating dimming schemes; processing of sensor data; display data analysis (e.g., image versus text); generating static, conditional, and/or operation-dependent user interface ("UI") components and/or selectable options within a display; dimming of portions of a display based on content to be displayed and environmental conditions detected via sensors; sensor sampling and polling schemes; and other relevant features.

DSU 250 may include processor 255, display 260, and sensor array 270 that respectively may be similar to processor 212, any of displays 230, and any of sensor arrays 270 previously described. That is, processor 255, display 260, and sensor array 270 may include similar features in terms of potential configurations, components incorporated thereby, and/or functional, performance, and/or integration capabilities. In some examples, DSU 250 may provide a stand-alone display that may operate or be operated independently of operations of display system 200 implemented by display control 210. In other examples, DSU 250, and processor 255 in particular, may provide redundancy with respect to display control 210.

More specifically, in some examples, processor 255 of DSU 250 may operate and communicate directly with comms mod 214. Furthermore, DSU 250 may implement coordination service 216, and otherwise facilitate all or partial operations of display control 210 in the event of an operational issue with any of the components of display control 210. In addition to providing display control redundancy, sensor array 270 may provide redundancy for sensor arrays 240, in whole or in part, for any of display sub-systems 220.

In still other examples, DSU 250 may serve as an addition to any of displays 230. More specifically, DSU 250 may be combined with one of displays 230 in order to extend a respective display layer 232 (and dimmable layer 234). Thus, in some examples, operation of DSU 250 may be controlled by coordination service 216 of display control 210, which may direct operations of processor 255 and display 260 of DSU 250. In addition, DSU 250 may switch between subordinate and independent operation modes based on a triggering event such as a user input, identification of a condition based on data from any of the sensors of display system 200, and/or the establishment or removal of a connection (e.g., physical, operative, communication-based) with display control 210 or any of display sub-systems 220. Thus, in some examples, DSU 250 may be connected and disconnected from display system 200 and operate as an independent transparent display on an as-needed basis.

One of ordinary skill in the art will recognize that like DSU 250, any of display sub-systems 220 of display system 200 may be disconnected from display control 210. Depending on an overall configuration of display system 200, such a disconnection may be completed without having to modify operations of the other display sub-systems 220, or modify connections of display sub-systems 220 with one another and/or display control 210. In some examples, DSU 250 may be added to transparent display sub-systems 220 as an addition or a replacement of one or more transparent display sub-systems 220. The same may be true of display sub-system provided as a replacement for one of display sub-systems 220, subject to how that display sub-system 220 is incorporated into an overall configuration of display system 200.

Configurations of display system 200 may be application dependent. For example, each of display sub-systems 220 may be installed in a respective window of a vehicle, such as an automobile, a bus, or an aircraft such as an electric vertical takeoff and landing (veto) vehicle. Accordingly, display layers 232 of displays 230 may be arranged in succession and thereby provide a substantially continuous area in which visual content of display data may be rendered, moved, and/or enlarged. Likewise, dimmable layers 234 may be arranged in succession and be configured to be dimmed uniformly in areas that bridge between displays 230. In still other examples, any of displays 230 may be installed within another display 230.

In some examples, coordination and dimming services 216, 238 may be responsible for different operations within display system 200. For example, an instance of dimming service 238, as implemented by processor 212 of display control 210 or a processor of a respective display 230, may perform the same operations as coordination service 216, but only with respect to the display, dimmable, and touch layers of a respective display 230. In such an example, displays 230 may be separate or otherwise dedicated to different content, such as transportation schedules on one display 230 and advertisements or other media on another display 230. As a result, coordination service 216 may serve as a control for when displays 230 may be active, and each dimming service 238 is responsible for visual content rendering in display layer 232, processing sensor data from sensor array 240, and dimming operations of dimmable layer 234 for a respective display 230.

In other examples, coordination service 216 may implement visual content rendering by display layers 232 and dimming operations by dimmable layers 234 across display sub-systems 220. Each dimming service 238 may serve, through comms mod 214, as an information source for coordination service 216 providing a current status of each dimmable portion of a dimmable layer 234 and combined feedback from sensors 242 of sensor array 240 for a respective display 230. In some examples, coordination service 216 may be configured to control adjacent portions of separate dimmable layers 234 and cause visual content to be rendered across displays 230 including adjacent portions in corresponding areas of respective display layers 232.

In some examples, display control 210 may switch between operation modes in which displays 230 are operated independently and in a coordinated manner. Coordination service 216 may be be configured implement mode changes based on a particular triggering event. Some examples of triggering events may include, but are not limited to: a time of day; a detected level of luminance by one or more sensors; a portion of an operation (e.g., takeoff, landing, edgewise flight operations) that a vehicle has progressed through; and a speed reached by a vehicle incorporating display system 200. In other examples, coordination service 216 may direct operation of some of displays 230 according to an independent mode and other displays 230 according to the coordinated mode. In still other examples, coordination service 216 may cause one display 230 to render, simultaneously, the visual content currently associated with that sub-display and visual content previously associated with another display 230. This may be occur in situations where a location of the other display 230 is subject to increased amounts of light that are more than a predetermined threshold.

Figure 3:
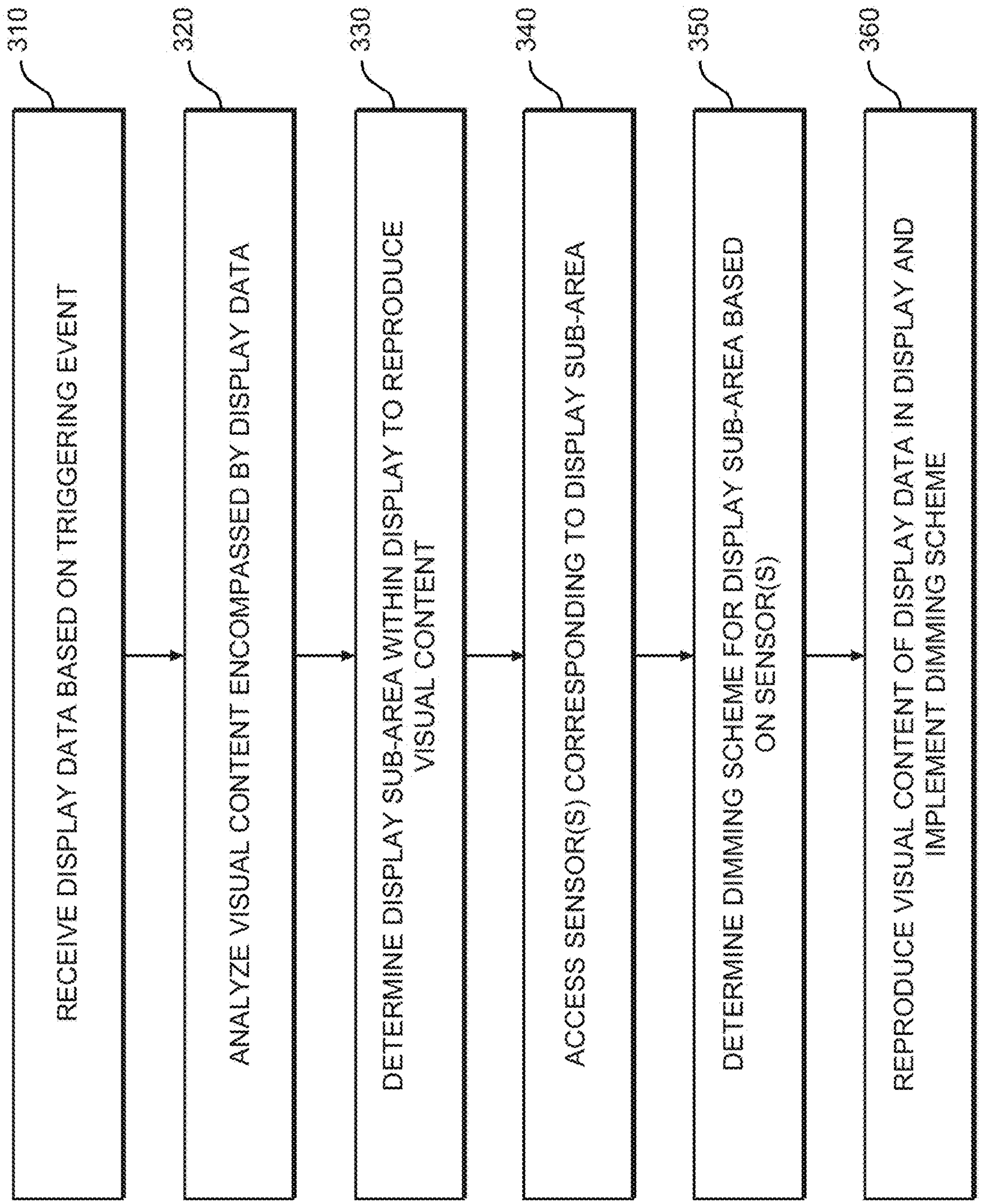
FIG. 3 depicts a flowchart of an example method for implementing a display including a dimmable layer, according to one or more aspects of the present disclosure.

FIG. 3 depicts a flowchart of an example method for implementing a display including a dimmable layer, according to one or more aspects of the present disclosure. At step 310, display data may be received based on a triggering event. In some examples, a triggering event may include: an increase or decrease in light (intensity, brightness, hue, pulse frequency, etc.); a change in speed of a vehicle including display; a change in weather where a display is located; input from a user through a computing device connected to display, a touch layer, or an external device; a physical act performed on a structure including display (e.g., some type of impact or application of force); a time of day; detection of a person or object; a change in proximity of a person or object relative to the display; a change in audience (such as an adult versus a child); a change in the type of visual content (e.g., text, image, video or other media) specified by display data; a discontinuance or resumption of display data reception; and/or any change in any parameter monitored by any sensor configured to communicate with a display (via, e.g., a computing device, display control, or DSU).

At step 320, the example method may include analyzing visual content encompassed by display data. A location within/sub-area of a display for rendering the visual content may be determined at step 330 based on the results of the analysis at 320. In some examples, this may include identifying a location and size of an area within the display to render the visual content.

At step 340, sensors corresponding to the display sub-area may be accessed and values of sensor-monitored parameters may be compared to threshold values. In some examples, a device such as display control 210, may determine a suitability of the location for the visual content versus other locations within the display, based on the comparisons. In still further examples, the location may be modified based on the comparisons performed at step 340.

At step 350, the example method may include determining a dimming scheme for the display sub-area corresponding to the location identified at steps 330 or 340, based on information from the sensor(s). Subsequently, at step 360, the visual content of the display data may be rendered in the display, and the dimming scheme may be implemented.

Figure 4A:
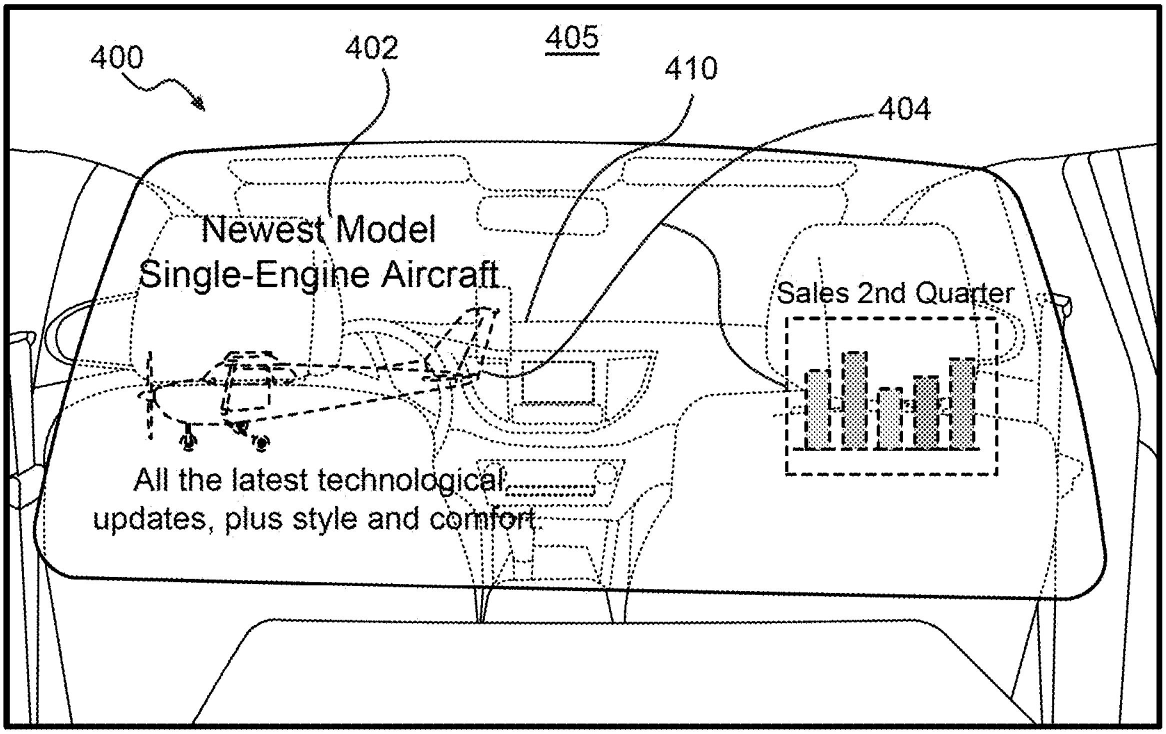
FIGS. 4A and 4B depict another example display, according to one or more aspects of the present disclosure.
Figure 4B:
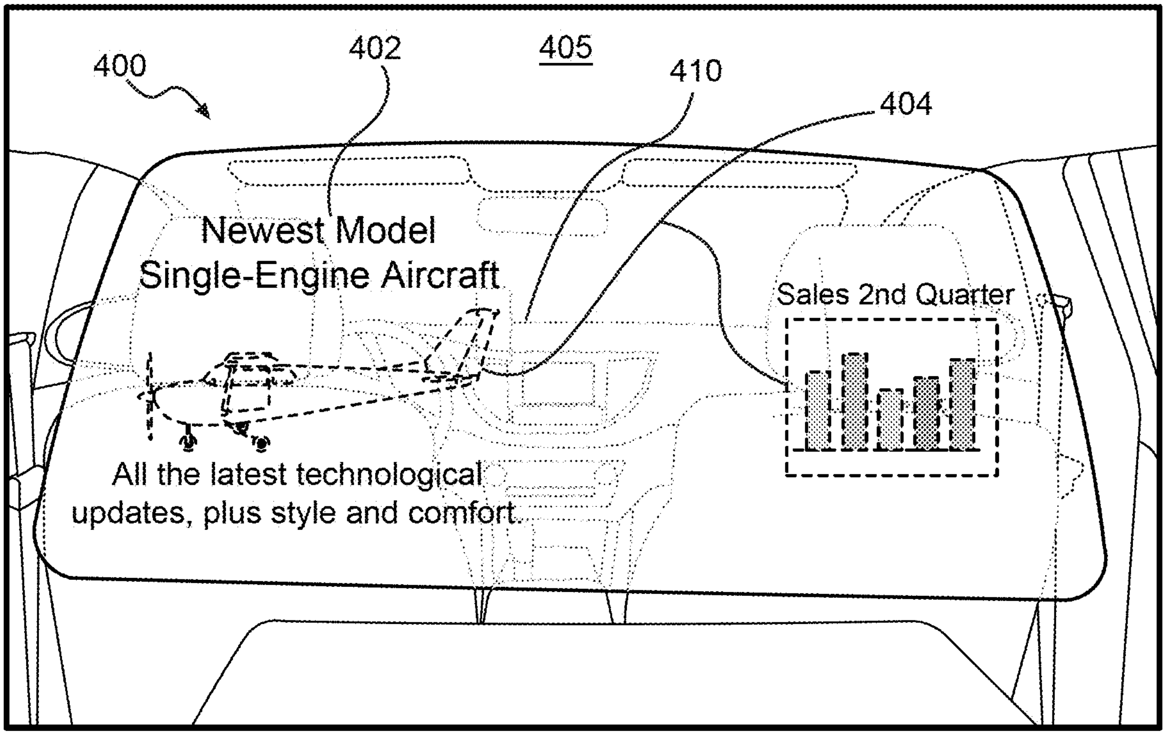

FIGS. 4A and 4B depict an example display 400, according to one or more aspects of the present disclosure. In some examples, display 400 may be used as, or otherwise provide, a divider between two areas of a vehicle 405 such as between front and back seats, or left and right front seats, or left and right sides of a back seat, or more generally in a space normally persisting between occupants. Display 400 may be part of or an entire area of the divider within the vehicle 405.

In one example, display 400 may be operated through a wired or wireless connection with a computer or mobile device. In another example, display 400 may be Wi-Fi or Bluetooth-compatible such that display 400 may be operated as an extended display. In other examples, display 400 may include a touch layer such that a passenger may provide inputs through the touch layer to interact with one or more programs or applications. For example, the touch layer may be operable for a user in a rear seat of a vehicle.

In still other examples, display 400 may be used as a display for displayed elements such as media, advertisements, or workspace information. Display 400 may be configured to display text 402 and/or images 404. As shown in FIG. 4A, such text 402 and/or images 404 may be difficult for a user to discern from background 410 because of a lack of contrast between background 410 and text 402 and/or images 404. As will be appreciated from FIG. 4B, display 400 may be configured to increase contrast between background 410 and text 402 and/or images 404.

More specifically, display 400 may include a dimmable layer, such as example dimmable layer 130 of display 100 of FIG. 1. Such a dimmable layer may be configured to dim background 410. In display 400 of FIGS. 4A and 4B, a dimmable layer may prevent light from traveling from the forward direction (e.g., from the front of the vehicle). Display 400 may be configured to utilize the dimmable layer previously mentioned to dim all of background 410. In other examples, display 400 may be configured to dim portions of display 400 that correspond to portions of background 410 that coincide with locations/areas where text 402 and/or images 404 are being displayed. Display 400 may dim background 410 in some areas more than others. Display 400 may dim background 410 where text 402 and/or images 404 lack contrast. Display 400 may be configured to dim background 410 around selected portions of displayed elements, wherein the selected portions are of less relative luminance of displayed elements when compared to a luminance of an environment. The environment, for example, can include the level of luminance on one or both sides of display 400.

A dimmable layer of display 400 may be adjusted by a user based on an input or command. Inputs or commands may be delivered in a physical (e.g., a button, a dial) form or through communication (e.g., a processor input or signal).

Figure 5:
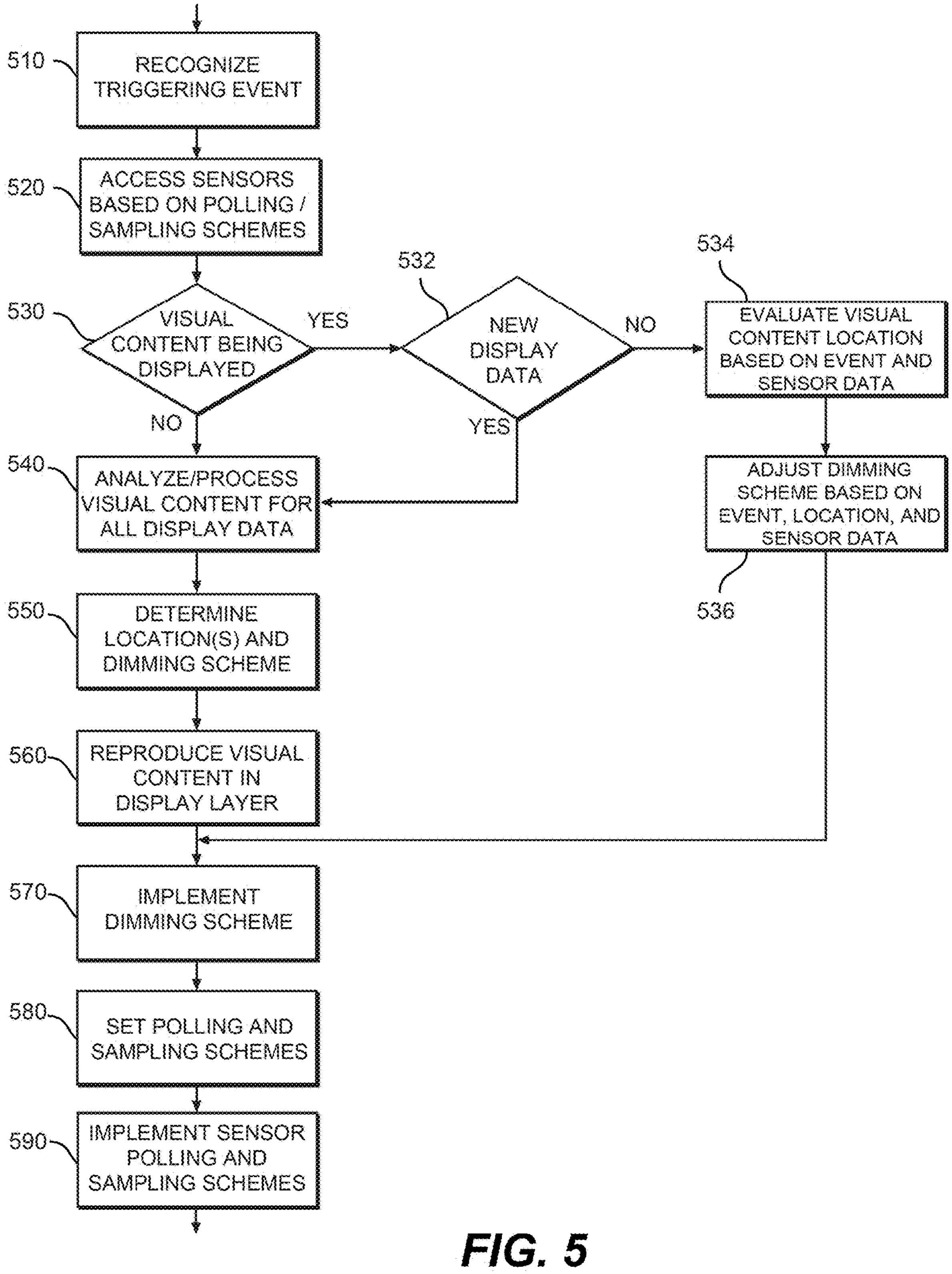
FIG. 5 depicts a flowchart of an example method for operating a dimmable layer of a display, according to one or more aspects of the present display.

FIG. 5 depicts a flowchart of an example method for operating a dimmable layer of a transparent or translucent display, according to one or more aspects of the present disclosure. At step 510, the example method may include recognizing a triggering event. The triggering event may include any of the example triggering events previously discussed. At step 520, sensors incorporated with (or coupled to) a display or display system may be polled based on a current polling scheme and sampling scheme. In some examples, a polling scheme may include an order by which a plurality of sensors are accessed, and a sampling scheme may specify a frequency by which one or more sensors or specific groups of sensors are accessed.

At step 530, the example method may include determining if visual content is currently being displayed. For instances in which visual content is being displayed, a display control or a processor for an example display, DSU, or stand-alone display may determine no new display data is associated with the triggering event at step 532, and evaluate a current location of the visual content at step 534. More specifically, sensor data for monitored parameters associated with the current location and the triggering event recognized at step 510 may be processed to determine whether another location on the display may be more optimal for producing the visual content. In some examples, other locations on the display may be evaluated based on a range of operations for a dimmable layer in a current location/sub-area, relative ranges of operations for the dimmable layer (or sections thereof) other locations/sub-areas on the display specific to the current visual content. In some examples, a range of operations of the dimmable layer, or sections thereof, may include degree of contrast, and/or or a range of degrees of contrast the dimmable layer is configured to implement.

Based on evaluations performed at step 534, the example method may include adjusting a dimming scheme at step 536. A dimming scheme according to the present disclosure may include a schedule of dimming operations that a dimming layer or sections of a dimming layer may be controlled to perform. In some examples, it may be determined that a rendering of the visual content may be moved to a different location at step 534. Accordingly, adjusting the dimming scheme at step 536 may include implementing different operations of a portion of a dimming layer, or sections of a portion of the dimming layer, corresponding to a new location/sub-area of the display. In other examples, a modification of a dimming scheme may include increasing or decreasing a degree of contrast of a dimming layer or one or more sections of the dimming layer for a current location where the current visual content is being rendered. In other examples, a modification of a dimming scheme may include changing a schedule for providing a certain degree of contrast in specified areas of a display.

In some instances, where new display data is associated with the triggering event at step 510 (as determined at step 532) and/or visual content is not currently being display (as registered at step 530), the example method may include analyzing visual content for all display data currently provided to a display at step 540. In some examples, analyzing the visual content may include determining or otherwise recognizing a type of visual content, colors and/or fonts to render, signal frequency required for rendering, and the like. According to some examples, types of visual content may include: an image, series of images, selectable user interface components, text, video, streaming video, pre-recorded video footage, live video footage, and the like. In other examples, analyzing the visual content at step 540 may include accessing lookup tables to determine optimal rendering parameters (e.g., overall size, image ratios, layouts, degrees of contrast for a background, data volume processing requirements).

At step 550, the example method may include determining location(s) within a display layer to render the visual content and a dimming scheme to implement in the determined locations. In some examples, a display control or a processor of a display, a stand-alone display, or a DSU may execute similar processes as those performed at steps 534 and 536. Based on the location(s) determined at step 550, the example method may include producing the visual content in the display layer at step 560. In addition, at step 570, the method may include implementing a dimming scheme adjusted at step 536 or determined at step 550. At steps 580 and 590, the example method may respectively include setting and implementing sensor polling and sampling schemes. In some examples, configuring the sensor polling and sampling schemes at steps 580, such as by a display control or processor, may be based on a triggering event recognized at step 510 and/or a dimming scheme adjusted at step 536 or determined at step 550.

Figure 6A:
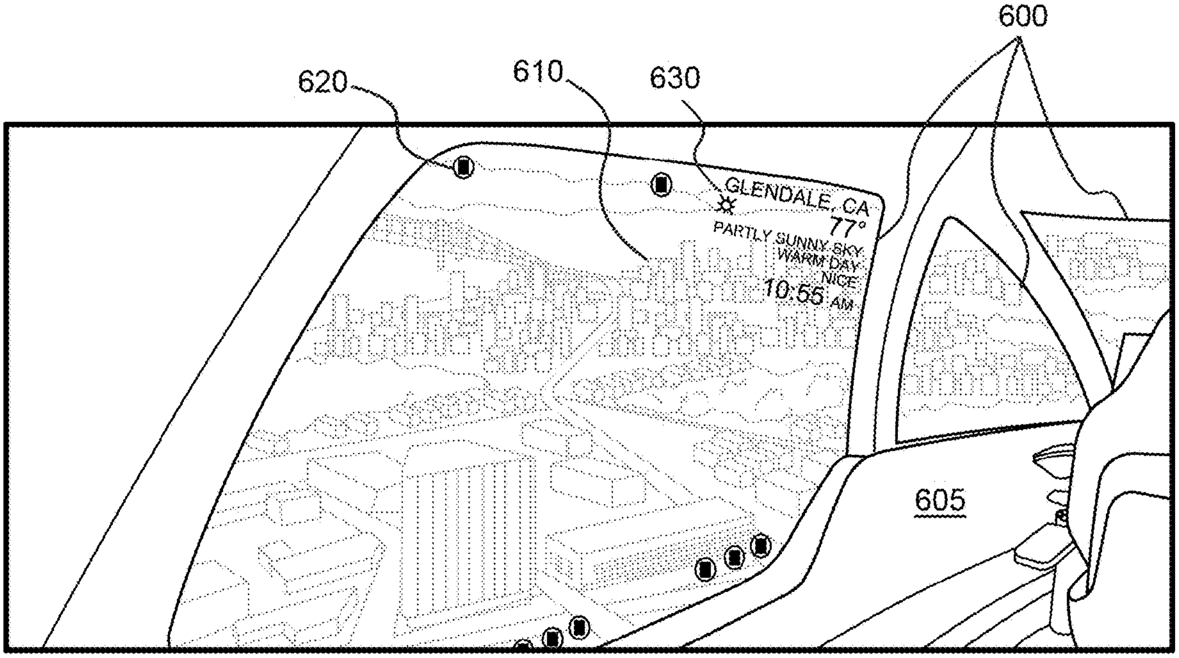
FIGS. 6A and 6B depict an example display, according to one or more aspects of the present disclosure.
Figure 6B:
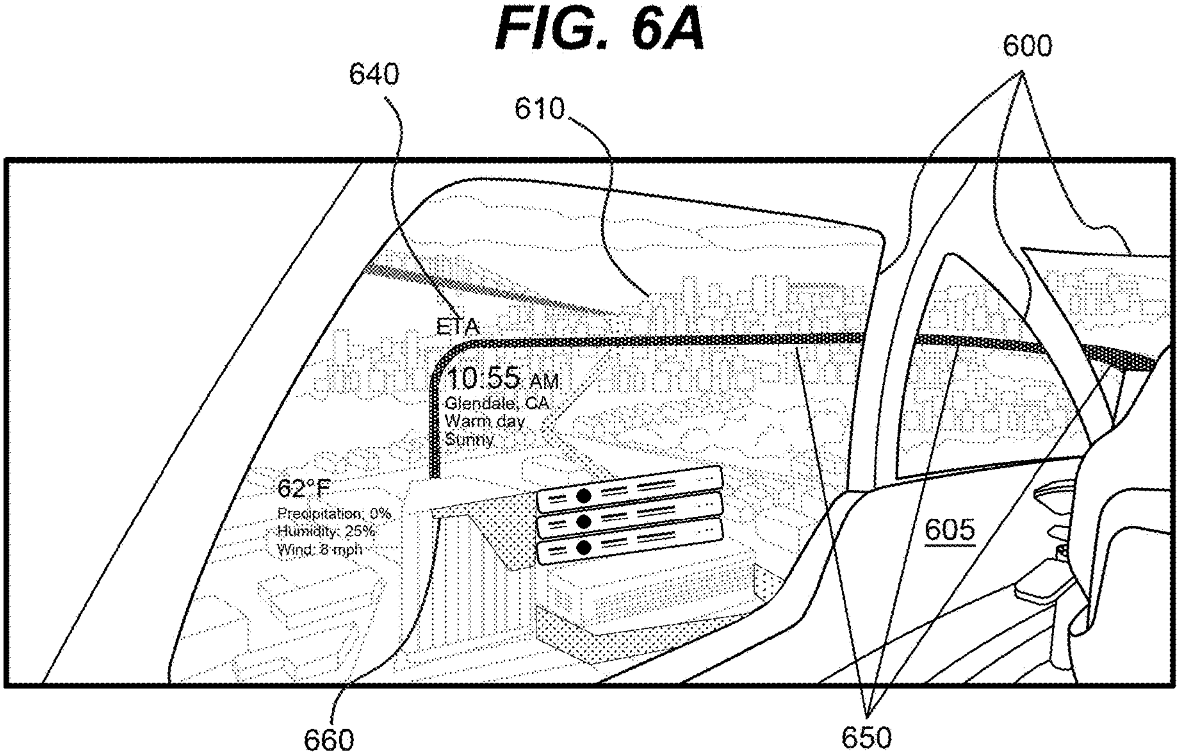

FIGS. 6A and 6B depict an example display 600, according to one or more aspects. As shown, display 600 may be used in a vehicle. For example, display 600 may be installed in an aircraft such as an airplane, helicopter, vertical take-off craft, or similar. Display 600 may include one or more displays that are operable individually or as a group. Display 600 may allow a passenger of the vehicle to see a background 610. In addition, display 600 may display elements such as user interfaces 620 or images and text 630. Display 600 may display route, building information, time, or other information. For example, display 600 may display the current time and/or the estimated time of arrival (ETA) 640. Display 600 may display route path 650. In addition, display 600 may be configured to highlight roadways or buildings of interest 660, as well as show traffic times.

In some examples, display 600 may be configured to dim background 610 to improve a relative contrast of any displayed element when compared to background 610. For example, display 600 may be configured to dim in sections, as a whole, or around only displayed elements. Display 600 may be configured to adjust dimming based on inputs from one or more user interfaces 620. In some examples where display 600 includes a touch layer, users may interact with user interfaces 620 directly by touching them to access applications, control functionality of display 600 (e.g., dimming) or portions thereof, and/or other controls to affect a passenger environment (e.g., cabin lighting, air flow, air conditioning).

In some examples, display 600 may comprise a sensor to detect a luminance or other monitored parameter (by, e.g., one or more sensors in a sensor array) input from inside the cabin and/or outside the cabin to determine a luminance and/or other monitored parameter of an environment surrounding display 600. In other examples, display 600 may adjust dimming (e.g., of a dimmable layer such as dimmable layer 130) to improve a contrast of display elements mentioned above when compared to the environment.

Figure 7:
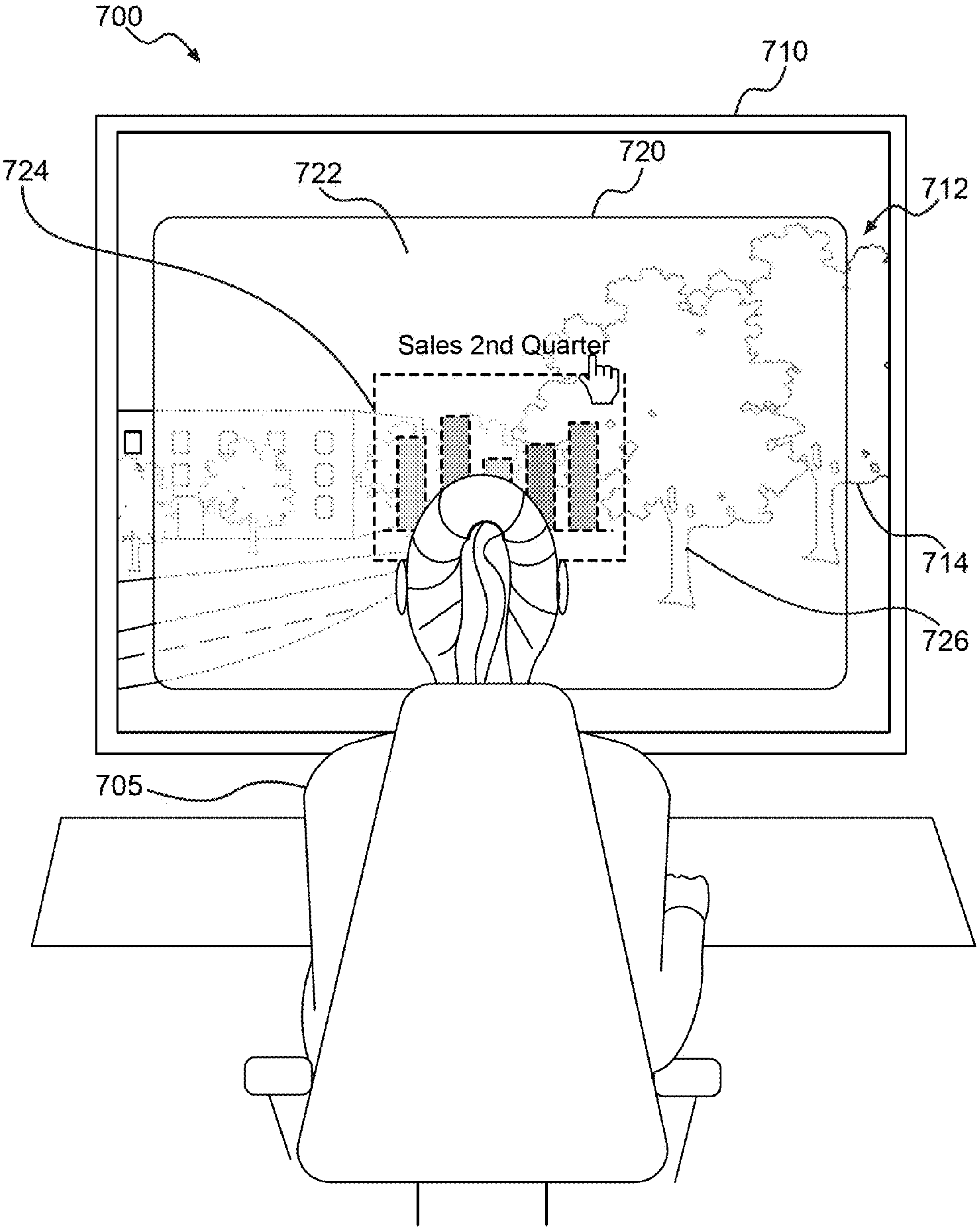
FIG. 7 depicts an example display, according to one or more aspects of the present disclosure.

FIG. 7 depicts an example display 700, according to one or more aspects of the present disclosure. As shown, display 700 may make up a portion or all of window 710. In one example, display 700 may provide or otherwise be used as a workspace. Window 710, as well as structural and functional components (e.g., structural and dimmable layers) of display, may be transparent or translucent such that an outside area 712 is visible within and outside of display sub-area 720. Display 700 may display visual content elements 724 within display sub-area 720. Window 710 may be transparent or translucent such that a portion of a view of outside area 712 corresponding to background 722 of display sub-area 720 is visible, and may have a dimmed appearance. Display 700 may be configured to dim background 722 via a dimmable layer as described herein, around display elements 724 so that display elements 724 are shown in contrast to background 722.

Window 710 may therefore be used as a typical window by user 705 when display 700 is not in operation. When display 700 is operating, window 710 provides display 700, and a configuration of display 700 within window 710 and allows for a partial (undimmed) view 714 and a dimmed view 726 of outside area 712. In addition, while the transparent or translucent attributes of the structure of display 700 permits dimmed view 726 of outside area 712 as shown, such a view may be modified (contrasted) by operation of the dimmable layer of display 700.

Figure 8:
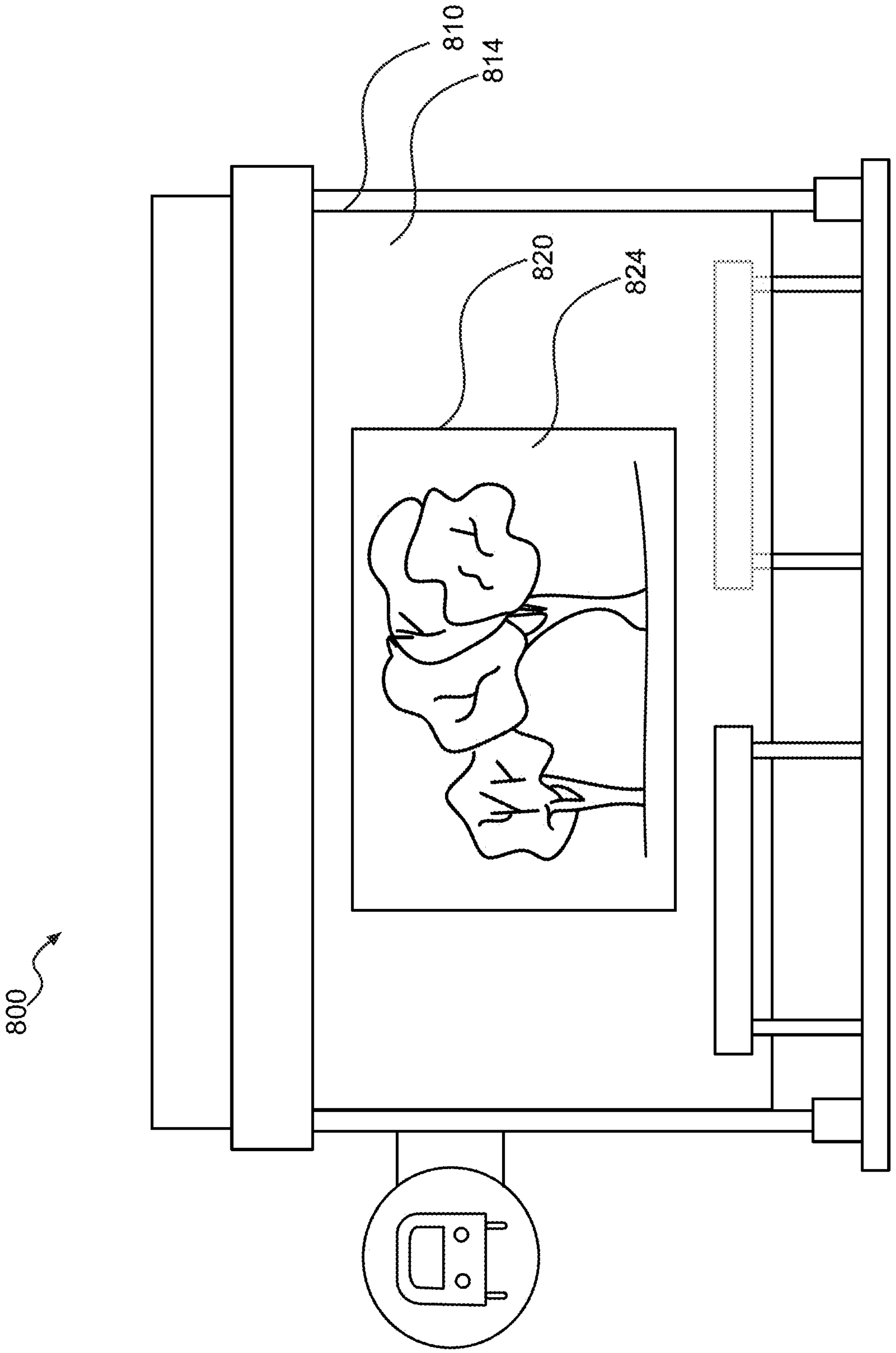
FIG. 8 depicts an example display, according to one or more aspects of the present disclosure.

FIG. 8 depicts an example display 800, according to one or more aspects of the present disclosure. Display 800 may be used as a stand-alone display 810. Display 800 may also be applied on a bus stop or other transit station window 814, a standing display at a conference or other exhibit, or via a computer monitor, tablet, or other small screen. For example, display 800 may be used for advertisement, media, or as a workspace. Display 800 may advantageously be visible from both sides, for example, for people waiting in a bus station and pedestrians walking past the bus station. Sub-display area 820 of display 800 may be configured to display visual content 824 that may include an image, text, media, or any other type of visual content described herein.

Display 800 may include a single display layer. For example, display layer may be positioned between two structural layers. Structural layers may be made of transparent or translucent material (e.g., glass, plastic, or any other material known to one of ordinary skill in the art). The display layer may comprise, for example, one or more of a liquid crystal display (LCD), a thin-film-transistor (TFT) liquid crystal display, light emitting diode (LED) displays and their derivatives, Organic LED (OLED), a polarizing filter, and a color filter. In some examples, display 800 may include a dimmable layer that may be be operated to provide a dark contrast layer that may be removed (via operation or physical removal of the dimmable layer) to make the display transparent.

Figure 9:
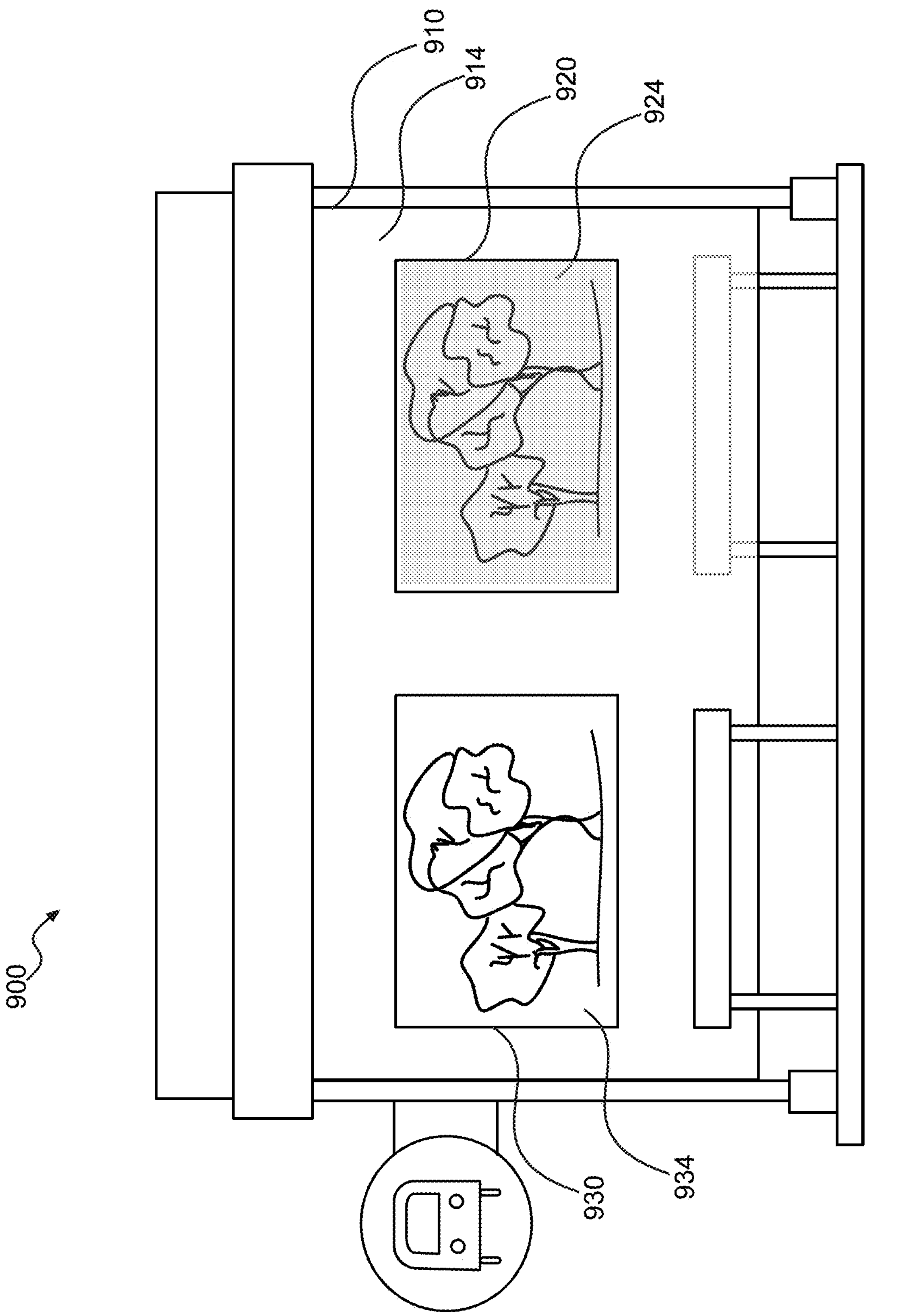
FIG. 9 depicts an example display, according to one or more aspects of the present disclosure.

FIG. 9 depicts an example display 900, according to one or more aspects of the present disclosure. Display 900 may be applied on a bus stop or other transit station window 910, a standing display at a conference or other exhibit, or via a computer monitor, tablet, or other small screen. In one example, display 900 may be used similarly to display 800 discussed above. Display 900 may be visible from both sides, and display elements such as first visual content 924 within first sub-display area 920. Display 900 may further include second sub-display area 930 in which second visual content 934 may be rendered. Text and other types of visual content may also be displayed in first sub-display area 920 and/or second sub-display area 930.

Display 900 may incorporate a dimmable layer according to the present disclosure, and thereby provide a dimming feature. In one example, display 900 may be dimmed to show contrast between background 914 and visual content, as shown with first sub-display area 920 in FIG. 9. As also shown in FIG. 9, operation of display 900 may include implementation of a dimmed state for first sub-display area 920 and an undimmed state with respect to second sub-display area 930. In other examples, operation of display 900 may provide for the implementation of dimmed states with both of first and second sub-display areas 920, 930. In still other examples, operation of display 900 may include implementation of un-dimmed states with both of first and second sub-display areas 920, 930. In still further examples, the dimmable layer may extend to, or additional dimmable layers may be installed in other locations corresponding to portions of background 914 that are not overlapping with one or both of first and second sub-display areas 920, 930.

Accordingly, operation of display 900 may include implementing dimmed and undimmed states in those locations surrounding first and second sub-display areas 920, 930 based on a current state (luminance, sunlight exposure, bystander proximity) of an environment surrounding display 900 or portions thereof. Display 900 may include one or more sensors or one or more sensor arrays as previously described, and the dimmed and undimmed states may be implemented based on values of parameters monitored by sensors. Such implementations may be carried out in accordance with the example methods described herein, such as the example methods associated with FIGS. 3 and 5, in some examples.

Figure 10:
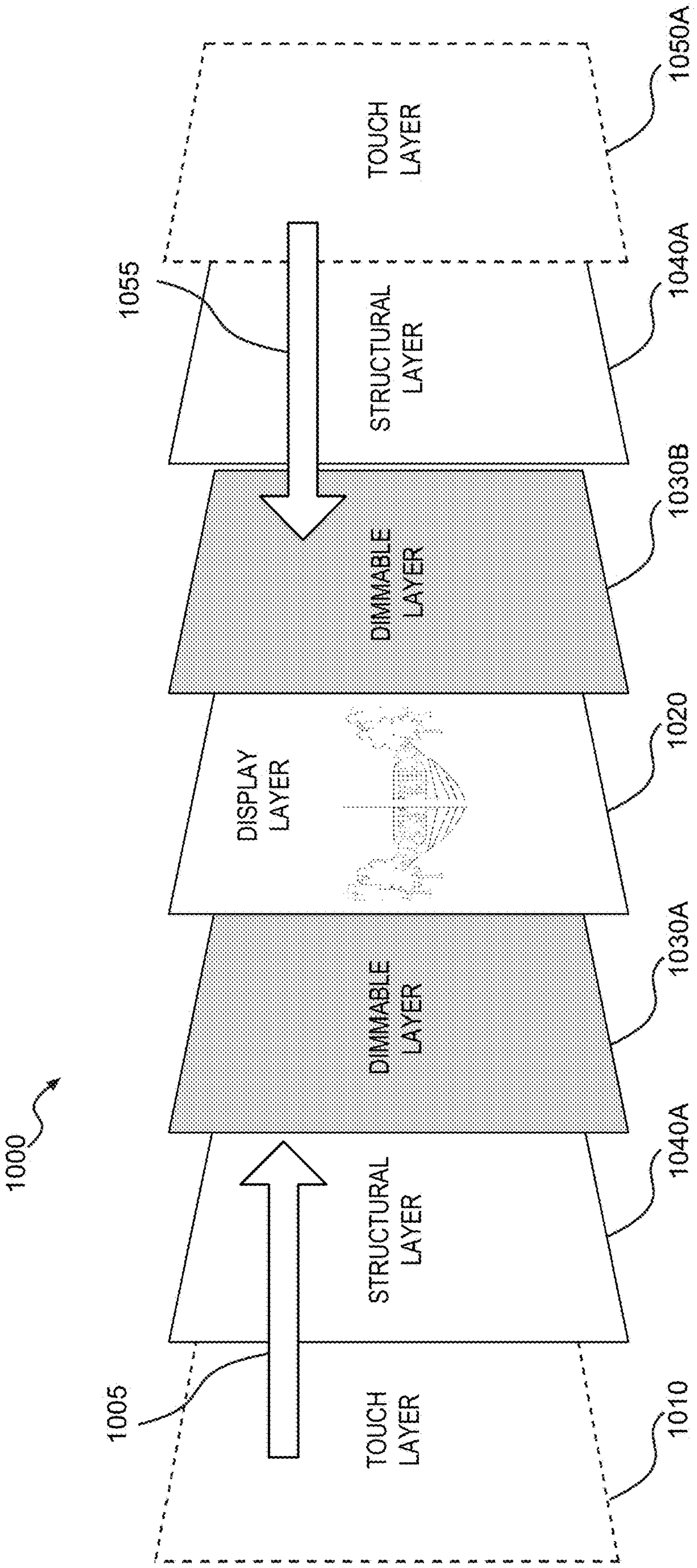
FIG. 10 depicts an exploded view of an example display, according to one or more aspects of the present disclosure.

FIG. 10 depicts an exploded view of an example display 1000, according to one or more aspects of the present disclosure. Display 1000 may include display layer 1020, first and second structural layers 1040A, 1040B, and first and second dimmable layers 1030A, 1030B positioned between display layer 1020 and a respective one of first and second structural layers 1040A, 1040B. In some examples, display 1000 may include touch layer 1050 disposed on either, both, or neither of first and second structural layers 1040A, 1040B. According to one or more aspects of the present disclosure, display 1000 may be a transparent or translucent display.

Similar to the example transparent displays described herein, such as any of displays 100, 230, 260, 400, 600, 700, 800, 900, display 1000 may be incorporated into a window, a stand-alone display, a tablet, a divider, a desk, or other structure. In one or all of these applications, display layer 1020 may be configured to display media, text, images, other types of visual content previously mentioned, or combinations thereof. For example, display layer 1020 may comprise a liquid crystal display (LCD), a thin-film-transistor (TFT) liquid crystal display, light emitting diode (LED) displays and their derivatives, Organic LED (OLED), a polarizing filter, and a color filter. Depending on the application, in various examples, first and second structural layers 1040A, 1040B may be comprised of glass, plastic, or any other transparent or translucent material. Furthermore, first and second structural layers 1040A, 1040B for display 1000 may be formed from the same or different materials.

Each of first and second dimmable layers 1030A, 1030B may include an electrochromatic layer, and may be configured to operate in a transmittance mode or a reflection mode. In some examples, each of first and second dimmable layers 1030A, 1030B may be operable by adjusting a respective input voltage. Both dimmable layers may be configured to block light from a respective one of first direction 1005 and second direction 1055 by increasing contrast (e.g., become darker) in one, more than one, or all areas of display 1000 coinciding with at least a portion of at least one of first and second dimmable layers 1030A, 1030B. In some examples, dimmable layer 1030 may be tinted to a darker color, for example, black or dark blue. One or both of first and second dimmable layers 1030A, 1030B may be configured to block some light or substantially all light (e.g., become substantially opaque) in an inactive state. In other examples, first and second dimmable layers 1030A, 1030B may be configured to default to a transparent or translucent condition in an inactive state. In some examples, one or both of first and second dimmable layers 1030A, 1030B may be configured to default to a transparent or translucent condition if power is lost, and either or both may include a battery backup power source, which may be tied to emergency lighting.

In some examples, the disclosed dimmable layers, such as dimmable layer 1030, may include separately dimmable sections. In addition, example dimmable layers according to the present disclosure may be configured to selectively dim around displayed elements. As with other dimmable layers described herein, first and second dimmable layers 1030A, 1030B may be controlled to selectively change degrees of luminance/contrast of different portions of that layer based on environment, actions of a user, position of a user relative to a display including the dimmable layer, content displayed by a display layer, and/or a location of particular displayed content relative to locations other content being displayed. Furthermore, each of first and second dimmable layers 1030A, 1030B may be configured to dim around selected portions of displayed elements, such that the selected portions are of less relative luminance when compared to the rendered display elements.

Figure 11:
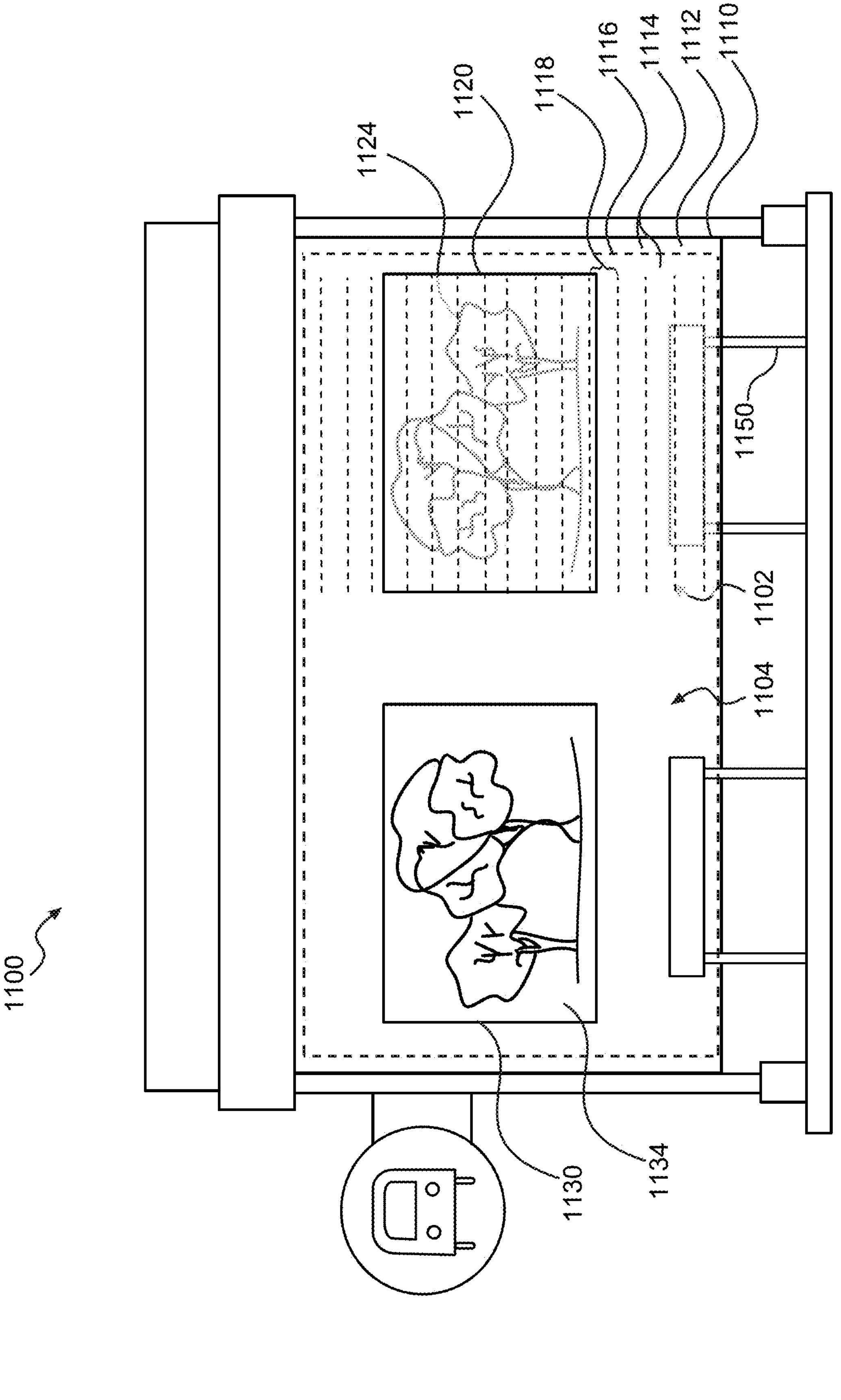
FIG. 11 depicts an example display, according to one or more aspects of the present disclosure.

FIG. 11 depicts an example display 1100, according to one or more aspects of the present disclosure. Display 1100 may be applied on a bus stop or other transit station window 1110, a standing display at a conference or other exhibit, or via a computer monitor, tablet, or other small screen. In one example, display 1100 may be used similarly to displays 800, 900 discussed above. Display 1100 may display elements such as first visual content 1124 within a first sub-display area 1120, on a first side 1102 of transit station window 1110. Display 1100 may further include a second sub-display area 1130 in which second visual content 1134 may be rendered for viewing on second side 1104 of transit station window 1110. Text, images, and/or other media (e.g., videos, series of images, rolling text, UI components) may be displayed in first and/or second sub-display areas 1120, 1130.

As shown in FIG. 11, display 1100 may incorporate one or more display layers 1112, and one or more dimmable layers 1116 according to the present disclosure. Each of first and second sub-display areas 1120, 1130 may be encompassed by (in the case of first sub-display area 1120) or include (in the case of the second sub-display area 1130) one or two dimmable layers 1116 positioned relative to an encompassing or respective display layer 1112. In some examples, dimmable layers 1116 may be extended over an entire area of window 1110 or select portions thereof. Accordingly, even though transit station window 1110 of FIG. 11 is transparent or translucent, operations of one or more dimmable layers 1116 of display 1100 may result in (controllably varied degrees of) dimmed views from second side 1104 of objects, individuals, buses, structures (e.g., bench 1105, buildings, etc.) and other things proximate to first side 1102.

In some examples, pairs of dimmable layers 1116 provided on first and second sides 1102, 1104 of display 1100 relative to one or more display layers 1112 may include separately dimmable sections 1118 on second side 1104 and a single area that may be dimmed uniformly on first side 1102. Alternatively, both dimmable layers 1116 of any pair of dimmable layers 1116 may be provided with sections 1118. Thus, each of first and second sub-display areas 1120, 1130 may be dimmed to show contrast between a respective background 1114 and visual content being presented in that sub-display area.

As shown in FIG. 11, the visual content may be orientated within a respective sub-display area according to a side of window 1110 on which the respective visual content is intended to be viewed. In addition, an operation of a dimmable layer or coordinated operations of dimmable layers in a particular sub-display area, may be specifically to controlled based on: (1) an orientation for how visual content in that sub-display area will be viewed; and (2) a side of window 1110 the visual content may be intended to be viewed on.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A display comprising:

at least one substantially transparent structural layer;

a display layer configured to present visual content;

a first dimmable layer positioned relative to a first surface of the display layer;

at least one sensor configured to monitor a parameter corresponding to a characteristic of an environment in which the display is provided, wherein the at least one sensor includes a plurality of sensors and wherein the plurality of sensors includes sensors configured to detect luminance and at least one of motion, fluorescent light, speed, and temperature; and a display control configured to control an input voltage to the first dimmable layer to operate the first dimmable layer to provide a degree of contrast based on values of the parameter provided by the at least one sensor.

2. The display of claim 1, wherein the sensors configured to detect luminance comprise sensors configured to detect luminance in the environment in which the display is provided.

3. The display of claim 1, further comprising a second dimmable layer positioned relative to a second surface of the display layer.

4. The display of claim 1, further comprising a touch layer positioned on the at least one structural layer, wherein the touch layer is configured to receive input associated with at least a portion of the visual content presented by the display layer.

5. The display of claim 1, wherein the visual content includes one or more of an image, text, and media.

6. The display of claim 1, wherein the first dimmable layer includes a plurality of sections, wherein each section is configured to be operated to provide a respective degree of contrast.

7. The display of claim 1, wherein the first dimmable layer is configured to be operated in an active state and an inactive state.

8. The display of claim 7, wherein the first dimmable layer is configured to be substantially transparent in one of the active state and the inactive state.

9. The display of claim 8, wherein the first dimmable layer includes sections, wherein the display control is configured to adjust respective input voltages to the sections to change degrees of contrast respectively provided by the sections.

10. The display of claim 7, wherein the first dimmable layer is configured to be substantially opaque in one of the active state and the inactive state.

11. The display of claim 1, wherein the display control is configured to adjust an input voltage to the first dimmable layer to change the degree of contrast.

12. A window including the display of claim 1.

13. A vehicle including the display of claim 1.

14. A display system comprising:

a first display;

a second display;

one or more processors; and one or more computer readable media comprising instructions;

wherein each of the first display and the second display includes:

at least one substantially transparent structural layer, a display layer configured to present visual content, a first dimmable layer positioned relative to a first surface of the display layer, and at least one sensor configured to monitor a parameter corresponding to a characteristic of an environment in which a respective one of the first and second displays is provided, wherein the at least one sensor includes a plurality of sensors and wherein the plurality of sensors includes sensors configured to detect luminance and at least one of motion, fluorescent light, speed, and temperature; and wherein the instructions, when executed by the one or more processors, cause the one or more processors to perform operations including operating the dimmable layers to provide respective degrees of contrast based on values of the parameter provided by respective at least one sensors.

15. The display system of claim 14, wherein the first display and the second display are positioned within a structure, and wherein the first display is surrounded by the second display.

16. The display system of claim 14, wherein each of the first display and the second display further includes a touch layer positioned on the at least one substantially structural layer, wherein the touch layer is configured to receive input associated with at least a portion of the visual content presented by the display layer.

17. The display system of claim 14, wherein the visual content includes one or more of an image, text, and media.

18. The display system of claim 14, wherein the first dimmable layer includes a plurality of sections, wherein each section is configured to be operated to provide a respective degree of contrast.

19. The display system of claim 14, wherein the first dimmable layer is configured to be operated in an active state and an inactive state.

20. The display system of claim 19, wherein the first dimmable layer is configured to be substantially transparent in one of the active state and the inactive state.

* * * * *